(12) United States Patent
Vega et al.

(10) Patent No.: US 11,787,247 B1
(45) Date of Patent: Oct. 17, 2023

(54) TRAILER COUPLER ASSEMBLY

(71) Applicant: Mod.al Group, Inc., American Fork, UT (US)

(72) Inventors: Erick Vega, Salt Lake City, UT (US); Kreg Peeler, Draper, UT (US); Angela Brimhall, Taylorsville, UT (US); Jeremy Carter, Orem, UT (US)

(73) Assignee: Mod.al Group, Inc., American Fork, UT (US)

( * ) Notice: Subject to any disclaimer, the term of this patent is extended or adjusted under 35 U.S.C. 154(b) by 88 days.

(21) Appl. No.: 17/729,862

(22) Filed: Apr. 26, 2022

(51) Int. Cl.
| | | |
|---|---|---|
| *B60D 1/36* | (2006.01) | |
| *B60D 1/06* | (2006.01) | |
| *B60D 1/56* | (2006.01) | |
| *B60D 1/24* | (2006.01) | |
| *B60D 1/26* | (2006.01) | |
| *B01D 1/26* | (2006.01) | |

(52) U.S. Cl.
CPC ............. *B60D 1/363* (2013.01); *B60D 1/065* (2013.01); *B60D 1/246* (2013.01); *B60D 1/26* (2013.01); *B60D 1/56* (2013.01)

(58) Field of Classification Search
CPC .......... B60D 1/26; B60D 1/246; B60D 1/363; B60D 1/56; B60D 1/065
USPC ................................ 280/479.1, 479.2, 479.3
See application file for complete search history.

(56) References Cited

U.S. PATENT DOCUMENTS

| | | | | |
|---|---|---|---|---|
| 5,725,234 A * | 3/1998 | Colibert | ................. | B60D 1/065 280/508 |
| 7,017,935 B1 * | 3/2006 | Bonfanti | ................ | B60D 1/065 280/491.5 |
| 7,425,016 B2 * | 9/2008 | Bowsher | ................. | B60D 1/00 280/515 |

* cited by examiner

*Primary Examiner* — Tony H Winner
*Assistant Examiner* — Felicia L. Brittman
(74) *Attorney, Agent, or Firm* — KIRTON MCCONKIE; Brian Tucker

(57) ABSTRACT

A trailer coupler assembly facilitates the automatic coupling and decoupling of a trailer. A trailer coupler assembly can include a main body with a frontward-facing opening for receiving a rearwardly oriented trailer ball. A locking assembly can be integrated with the main body and can allow the rearwardly oriented trailer ball to insert into the frontward-facing opening to automatically secure a trailer to a vehicle. A release assembly can interface with the locking assembly to enable the rearwardly oriented trailer ball to be decoupled from the main body.

20 Claims, 10 Drawing Sheets

TRAILER COUPLER ASSEMBLY

CROSS-REFERENCE TO RELATED APPLICATIONS

N/A

BACKGROUND

A trailer coupler is the front portion of a trailer by which the trailer is coupled to a vehicle for towing. Typically, a trailer coupler includes a downward-facing opening that is lowered overtop an upwardly oriented trailer ball. Once the trailer ball is positioned within the trailer coupler, the user must typically manually activate a latch to thereby secure the trailer coupler to the trailer ball. Accordingly, the typical process for hitching a trailer to a vehicle is manual and tedious.

BRIEF SUMMARY

The present invention is directed to trailer coupler assemblies that facilitate the automatic coupling and decoupling of a trailer. A trailer coupler assembly can include a main body with a frontward-facing opening for receiving a rearwardly oriented trailer ball. A locking assembly can be integrated with the main body and can allow the rearwardly oriented trailer ball to insert into the frontward-facing opening to automatically secure a trailer to a vehicle. A release assembly can interface with the locking assembly to enable the rearwardly oriented trailer ball to be decoupled from the main body.

In some embodiments, the present invention may be implemented as a trailer coupler assembly that includes a main body and a locking assembly. The main body may have a frontward-facing opening that is configured to receive a rearwardly oriented hitch ball. The locking assembly may include at least one securing pin that extends across the frontward-facing opening.

In some embodiments, the locking assembly may include opposing securing pins and a distance between the opposing securing pins is configured to be less than a diameter of the rearwardly oriented hitch ball.

In some embodiments, each of the opposing securing pins includes a notch.

In some embodiments, when the notches face one another, a distance between the notches is greater than the diameter of the rearwardly oriented hitch ball to thereby allow the rearwardly oriented hitch ball to pass between the opposing securing pins.

In some embodiments, the main body includes opposing housings in which the opposing securing pins are positioned.

In some embodiments, the opposing securing pins rotate within the opposing housings.

In some embodiments, the opposing securing pins are biased to orient the notches frontwardly.

In some embodiments, the opposing securing pins are configured to rotate in response to the rearwardly oriented hitch ball being forced rearwardly against the opposing securing pins to thereby cause the notches to face one another.

In some embodiments, the opposing housings include cutouts that correspond with the frontward-facing opening.

In some embodiments, the opposing securing pins extend into the cutouts to thereby overlap the frontward-facing opening.

In some embodiments, the trailer coupler assembly may include a release assembly that is configured to rotate the opposing securing pins to cause the notches to face one another.

In some embodiments, the release assembly includes one or more wires that are pulled by a motor to cause the opposing securing pins to be rotated.

In some embodiments, the main body includes beveled edges at opposing sides of the frontward-facing opening.

In some embodiments, the main body includes a hollow rear interior by which the main body is coupled to a shaft and a bumper that is positioned within the hollow rear interior, the bumper being compressible to enable the main body to pivot relative to the shaft.

In some embodiments, the present invention may be implemented as a trailer coupler assembly that includes a main body having a frontward-facing opening that is configured to receive a rearwardly oriented hitch ball and opposing housings positioned at a top and a bottom of the frontward-facing opening. The trailer coupler assembly also includes a locking assembly comprising opposing securing pins that are positioned within the opposing housings. The opposing securing pins are configured to rotate between a first orientation in which the rearwardly oriented hitch ball is prevented from passing through the frontward-facing opening and a second orientation in which the rearwardly oriented hitch ball is allowed to pass through the frontward-facing opening.

In some embodiments, each of the opposing securing pins includes a notch, and, when the opposing securing pins are in the second orientation, the notches face one another.

In some embodiments, the notches are oriented frontwardly when in the first orientation and are biased into the first orientation such that, when the rearwardly oriented hitch ball is forced rearwardly against the notches, the opposing securing pins are rotated into the second orientation.

In some embodiments, the trailer coupler assembly may include a release assembly that is configured to rotate the opposing securing pins from the first orientation to the second orientation.

In some embodiments, the present invention may be implemented as a trailer coupler assembly that includes a main body having a frontward-facing opening and at least one housing having a cutout corresponding to the frontward-facing opening. The trailer coupler assembly also includes a locking assembly comprising at least one securing pin that is positioned in the respective at least one housing and extends out from the cutout overtop the frontward-facing opening. Each of the at least one securing pin include a notch for selectively enabling a rearwardly oriented hitch ball to passthrough the frontward-facing opening.

In some embodiments, each of the at least one securing pin is configured to rotate between a first orientation in which the notch prevents the rearwardly oriented hitch ball from passing through the frontward-facing opening and a second orientation in which the notch enables the rearwardly oriented hitch ball to pass through the frontward-facing opening.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Embodiments of the present invention encompass trailer coupler assemblies that facilitate the automatic coupling and decoupling of a trailer. A trailer coupler assembly configured in accordance with embodiments of the present invention can be used on any trailer that is intended to be coupled to a vehicle via a receiver hitch.

Figure 1A:
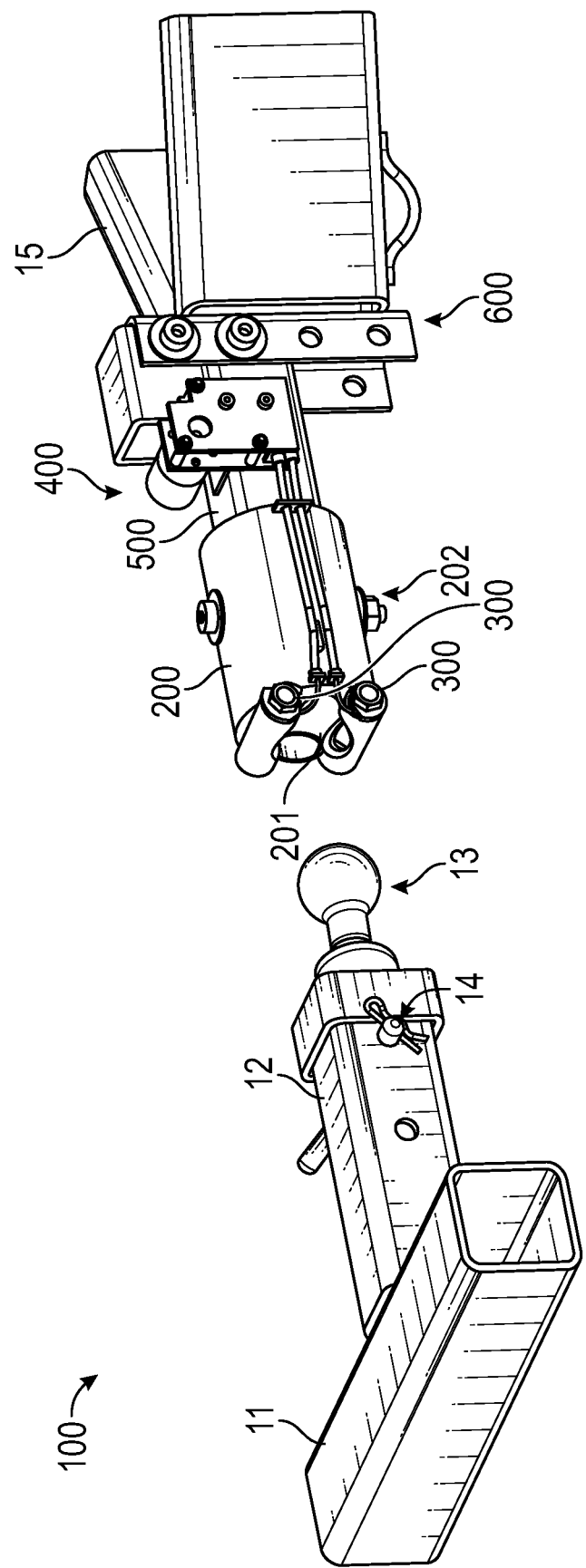
FIGS. 1A and 1B are side perspective and front views respectively of a trailer coupler assembly configured in accordance with one or more embodiments of the present invention.
Figure 1B:
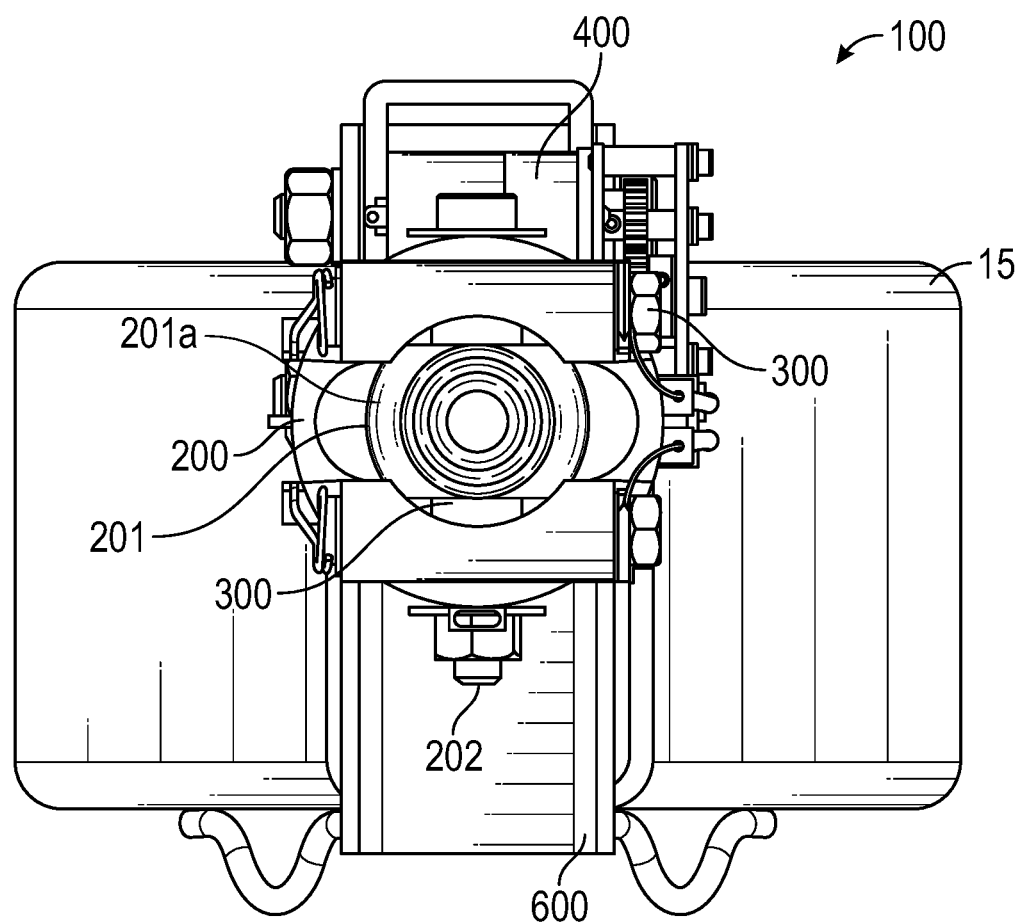

FIGS. 1A and 1B are side perspective and front views respectively of a trailer coupler assembly 100 that is configured in accordance with one or more embodiments of the present invention. Trailer coupler assembly 100 may include a main body 200, a locking assembly 300, and a release assembly 400. Trailer coupler assembly 100 may be mounted to, integrated with, or otherwise secured to a frame 15 of a trailer in any suitable manner. In the depicted example, trailer coupler assembly 100 includes a shaft 500 to which main body 200 is secured and a bracket 600 that is coupled to frame 15 and enables the height of shaft 500 relative to the trailer to be adjusted. For example, bracket 600 may include a vertical arrangement of holes that allow the rear end of shaft 500 to be mounted to bracket 600 at different vertical positions.

FIG. 1A also shows a receiver hitch 11 from which a receiver tube 12 extends. Receiver hitch 11 may typically be a rear receiver hitch but could also be a front receiver hitch or any other hitch capable of supporting a trailer ball in the depicted orientation. To enable trailer coupler assembly 100 to be used with a vehicle having receiver hitch 11 and receiver tube 12, a rearwardly oriented hitch ball 13 (hereinafter hitch ball 13) can be inserted into receiver tube 12 and secured via a hitch pin 14. In some embodiments, hitch ball 13 could be a gooseneck hitch ball but any hitch ball that would be rearwardly oriented when inserted into receiver tube 12 could be used. In this context, the terms frontward and rearward should be construed as oriented towards the vehicle and oriented towards the trailer respectively when a trailer having trailer coupler assembly 100 is towed.

Main body 200 includes a frontward-facing opening 201 that is configured to receive hitch ball 13. Main body 200 may be configured to couple to shaft 500 via a pivoting connection 202 (e.g., via a vertically oriented bolt). As described in greater detail below, pivoting connection 202 can increase the articulation angle of a trailer when coupled to a vehicle via trailer coupler assembly 100.

Figure 2A:
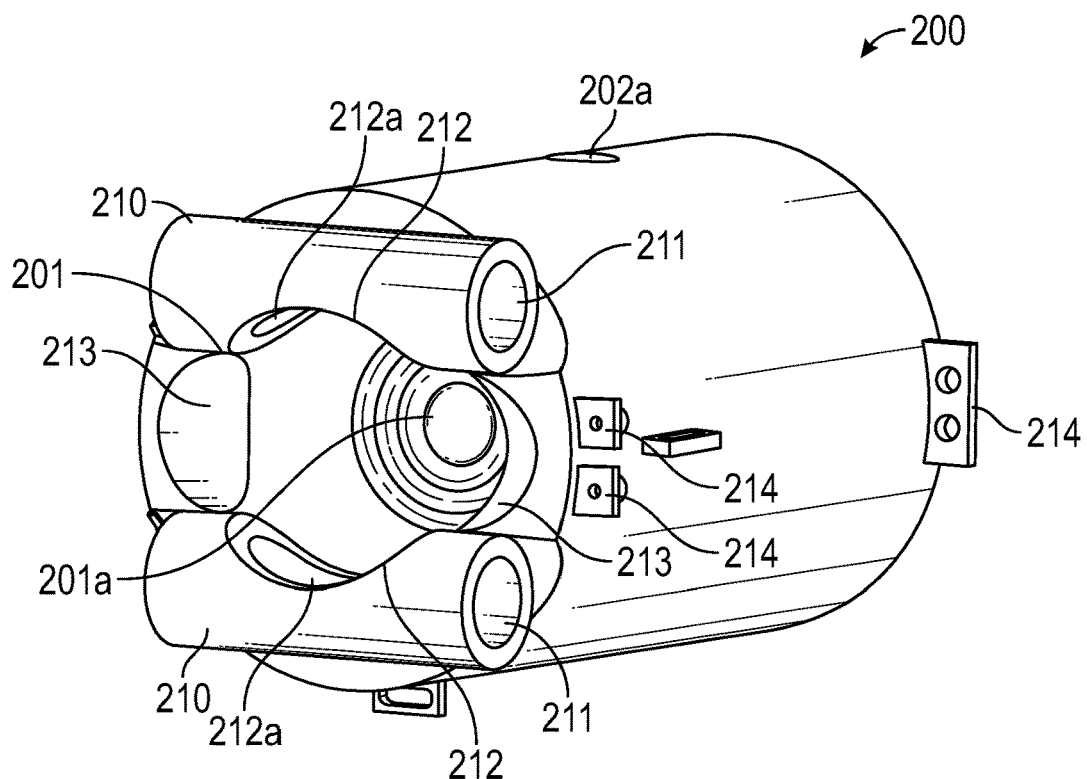
FIGS. 2A-2E are various views of a main body of a trailer coupler assembly configured in accordance with one or more embodiments of the present invention.
Figure 2B:
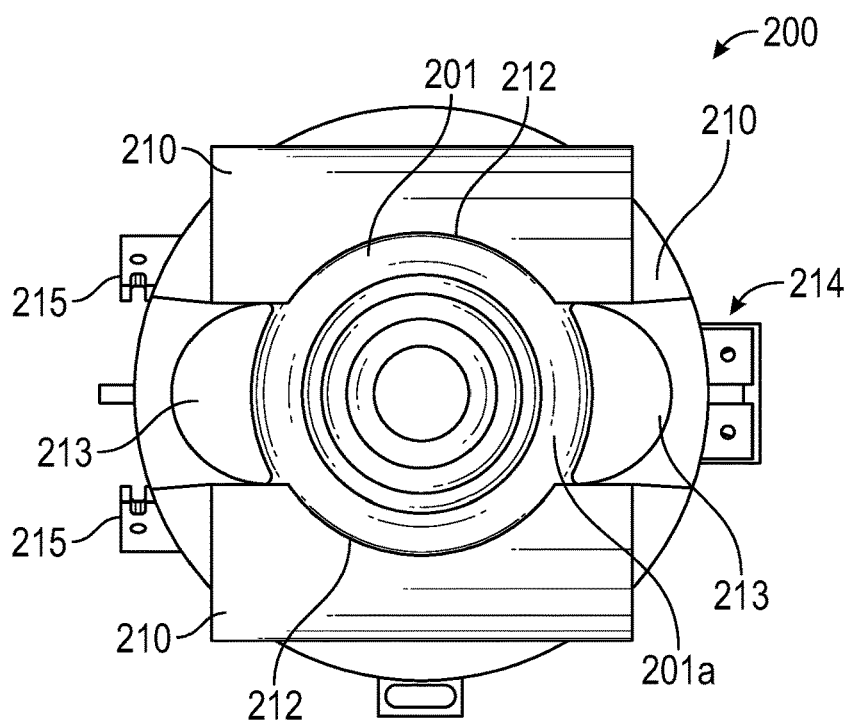
Figure 2C:
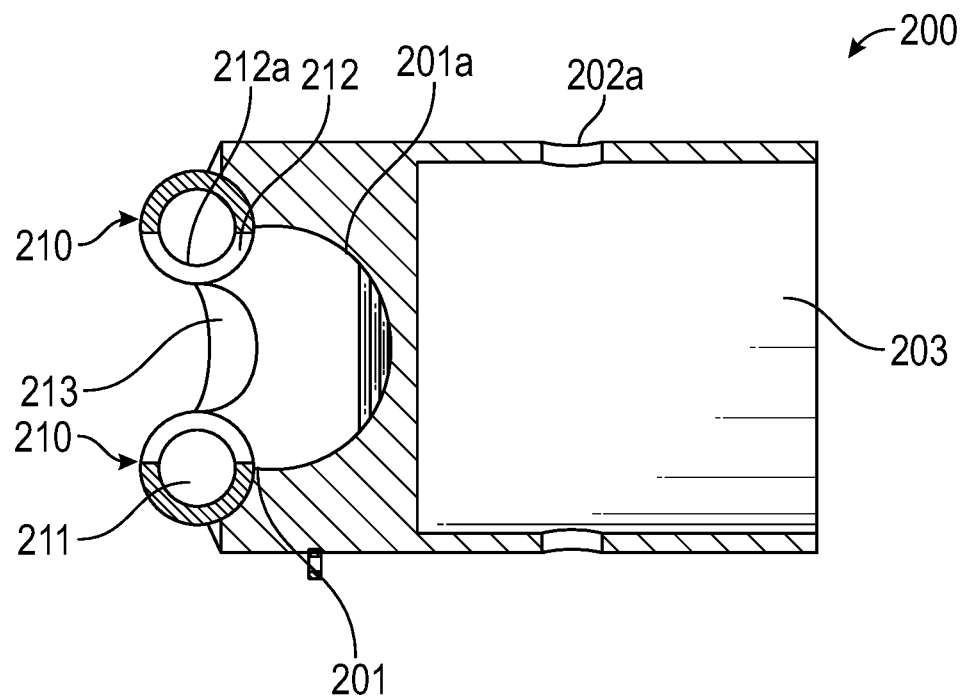

FIGS. 2A-2C are side perspective, front, and side cross-sectional views respectively of main body 200 in isolation. As shown, frontward-facing opening 201 may have a generally circular shape and may form a generally round interior surface 201a which may correspond to the shape and size of hitch ball 13. Opposing housings 210 may be positioned towards the top and bottom of the front of main body 200 (or possibly towards the sides of main body 200). Housings 210 may be in the form of cylinders having a hollow interior 211 for receiving portions of locking assembly 300. Each housing 210 may include a cutout 212 that corresponds with frontward-facing opening 201. For example, as best seen in FIG. 2B, each cutout 212 may have a semi-circular shape that generally aligns with the portion of frontward-facing opening 201 over which it is positioned. Cutout 212 may extend into hollow interior 211 of housing 210 to thereby form an opening 212a. In other embodiments, main body 200 may include only a single housing 210 (e.g., only a top housing 210, only a bottom housing 210, etc.).

In some embodiments, main body 200 may include opposing beveled edges 213 at opposing sides of frontward-facing opening 201. Each beveled edge 213 may have an arcuate shape and may enable an increased articulation angle of a trailer when coupled to a vehicle via trailer coupler assembly 100. Main body 200 may include guides 214 for accommodating portions of release assembly 400 and mounts 215 for accommodating portions of locking assembly 300.

Figure 2D:
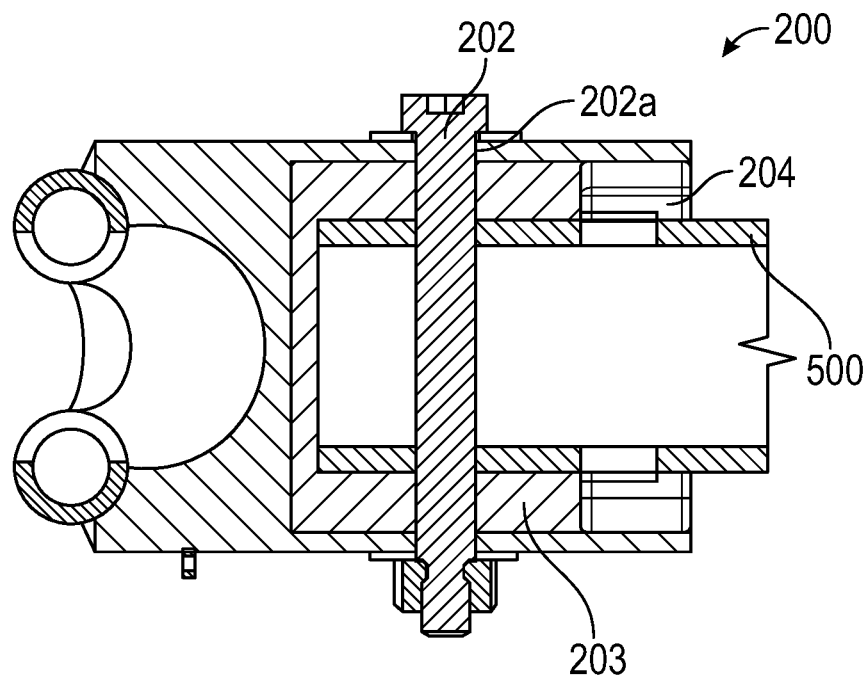
Figure 2E:
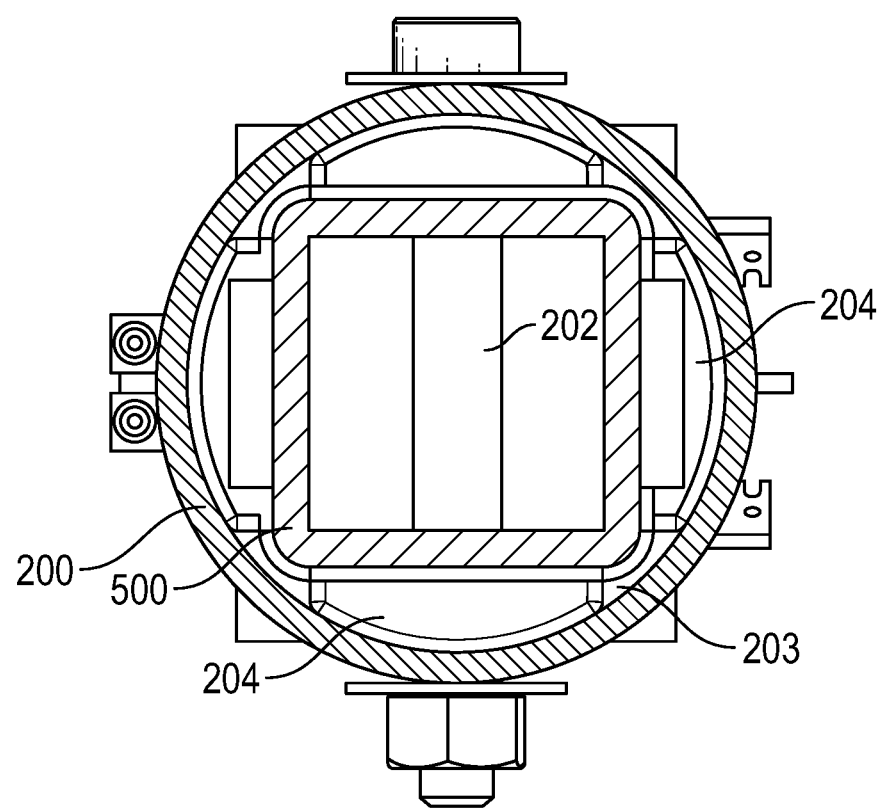

Main body 200 may also form a hollow rear interior 203 as best seen in FIG. 2C. Opposing openings 202a may extend into hollow rear interior 203 and may receive a bolt or other connection member for forming pivoting connection 202. FIGS. 2D and 2E are cross-sectional side and rear views respectively of main body 200 when coupled to shaft 500. As shown, shaft 500 may extend into hollow rear interior 203 and may include openings that align with openings 202a to thereby allow a bolt or other connection member to secure main body 200 to shaft 500 via pivoting connection 202.

Shaft 500 may be smaller than hollow rear interior 203 so that main body 200 may pivot relative to shaft 500. A bumper 204 may be positioned inside hollow rear interior 203 and may at least partially surround shaft 500. Bumper 204 may be sandwiched between shaft 500 and the wall of hollow rear interior 203 to thereby limit the pivoting of main body 200 relative to shaft 500. However, bumper 204 may be formed of rubber or another compressible material to thereby allow controlled pivoting of main body 200. For example, bumper 204 could be sufficiently compressible to allow main body 200 to pivot five degrees relative to shaft 500 to thereby increase the articulation angle of a trailer when coupled to a vehicle via trailer coupler assembly 100.

Figure 3A:
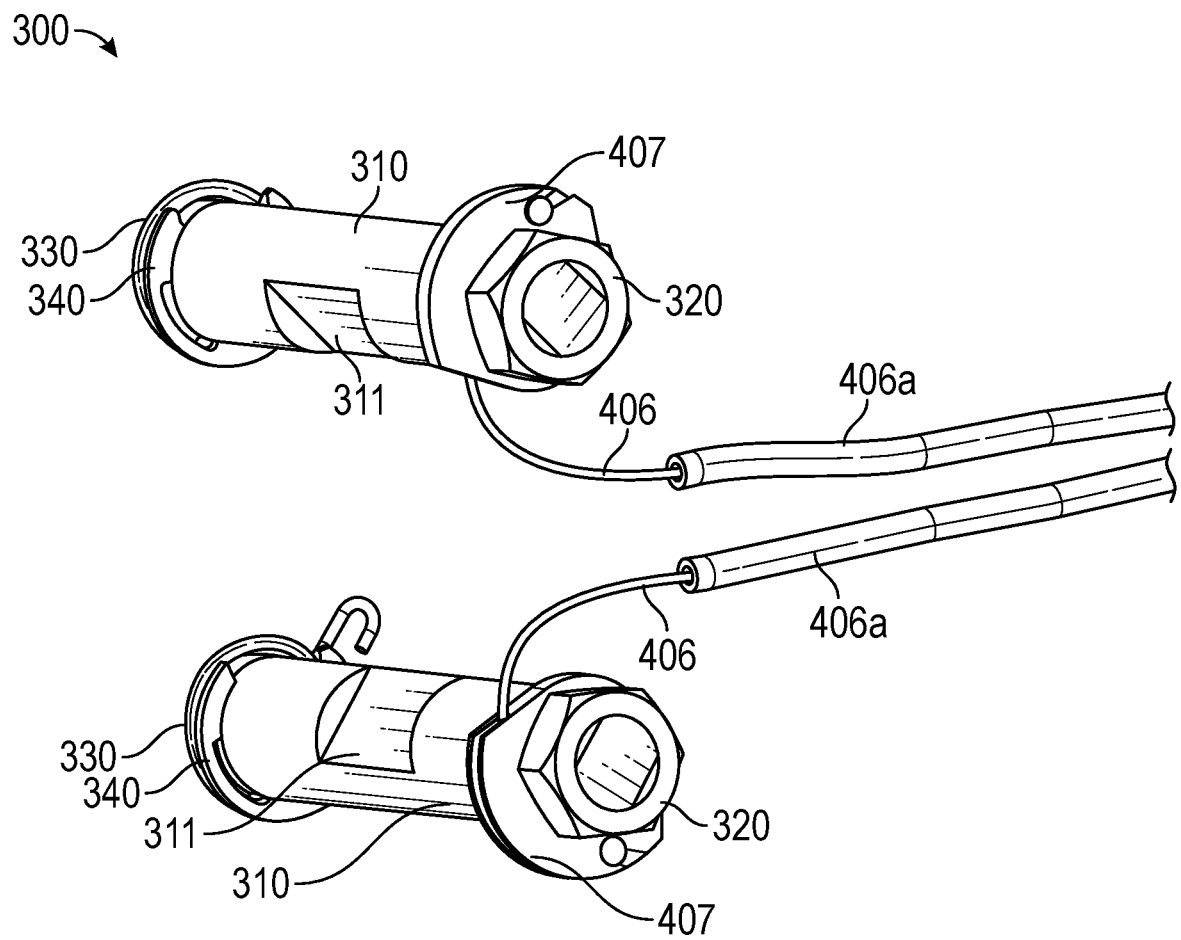
FIGS. 3A-3D are various views of a locking assembly of a trailer coupler assembly configured in accordance with one or more embodiments of the present invention.
Figure 3B:
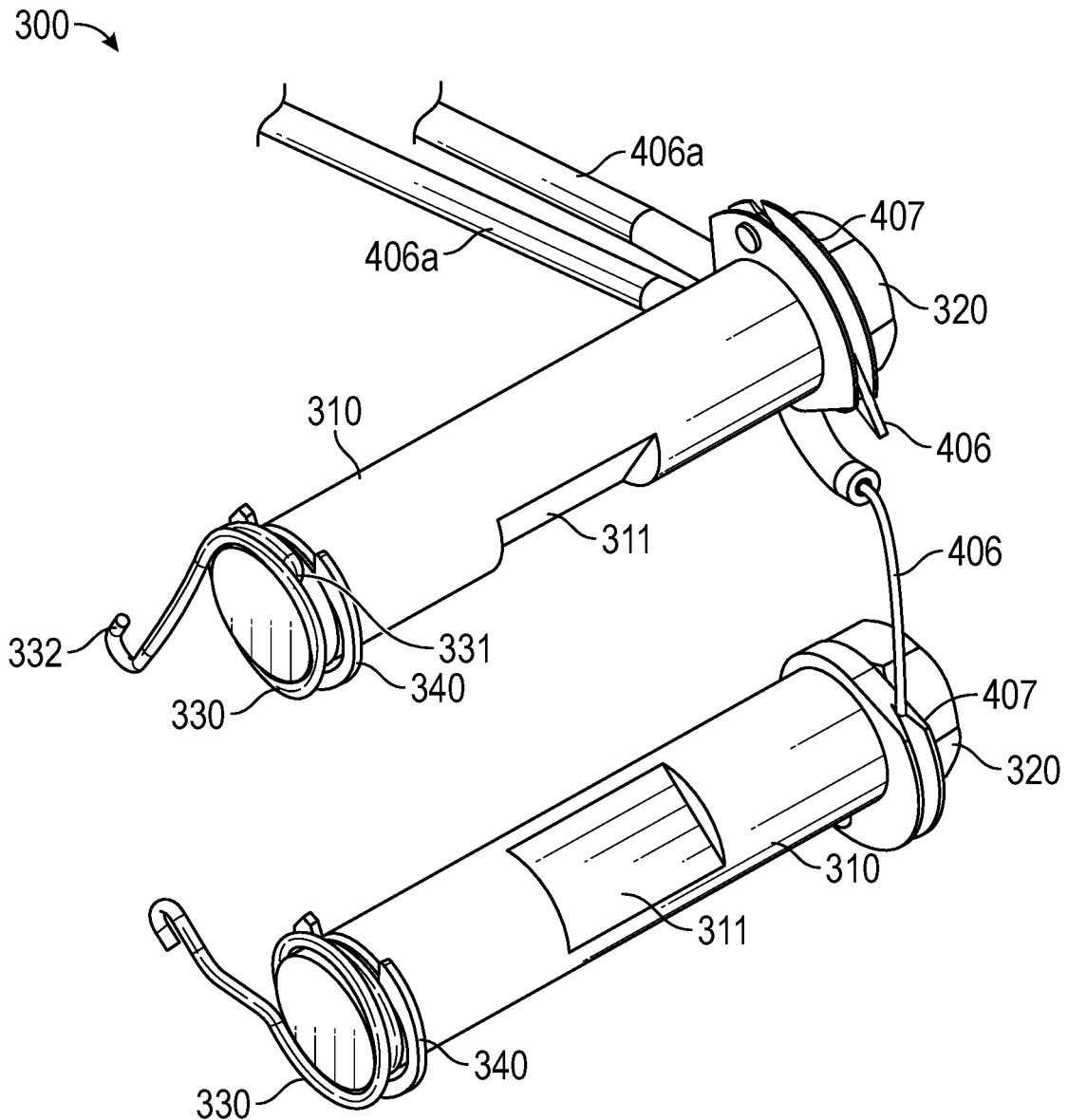

FIGS. 3A and 3B are perspective views of locking assembly 300 along with portions of release assembly 400. Locking assembly 300 includes opposing securing pins 310 that are configured to be positioned in housings 210. For example, securing pins 310 can have a cylindrical shape that matches the shape of hollow interior 211 to thereby allow securing pins 310 to be rotated within hollow interior 211. The length of securing pins 310 can exceed the length of housing 210 such that each end of securing pins 310 extends out from housing 210. A retaining ring 340 may be coupled around one end of securing pins 310 and a bolt 320 or other fastener may be secured to the opposing end of securing pins 310 to thereby retain securing pins 310 within housings 210.

As stated above, in some embodiments, main body 200 may have only a single housing 210 in which case locking assembly 300 may include a single securing pin 310.

Frontward-facing opening 201 is sufficiently large to receive hitch ball 13 (i.e., its diameter is greater than the diameter of hitch ball 13). However, with securing pins 310 inserted into housings 210, securing pins 310 extend into cutouts 212 overtop frontward-facing opening 201. The spacing between housings 210 can be configured to ensure that the distance between the outer surface/diameter of securing pins 310 is less than the diameter of hitch ball 13 (i.e., hitch ball 13 will be prevented from passing between securing pins 310). In embodiments that include a single housing 210 and securing pin 310, the distance between securing pin 310 and the opposing side of frontward-facing opening 201 can be less than the diameter of hitch ball 13.

To enable hitch ball 13 to pass between securing pins 310 (or past securing pin 310 in embodiments with a single securing pin 310), a notch 311 may be formed in the outer surface of securing pins 310. Securing pins 310 can be oriented within housings 210 so that notches 311 are generally oriented towards one another. A spring 330 or other biasing member may be used to bias securing pins 310 into the orientation shown in FIGS. 3A and 3B. For example, one end 331 of spring 330 may be fixed to securing pin 310 while the other end 332 of spring 330 may be secured to mounts 215 on main body 200. Spring 330 can be wrapped around securing pin 310 to create the biasing force. In this orientation, notches 311 face slightly frontward as is best shown in FIG. 1B.

Figure 3C:
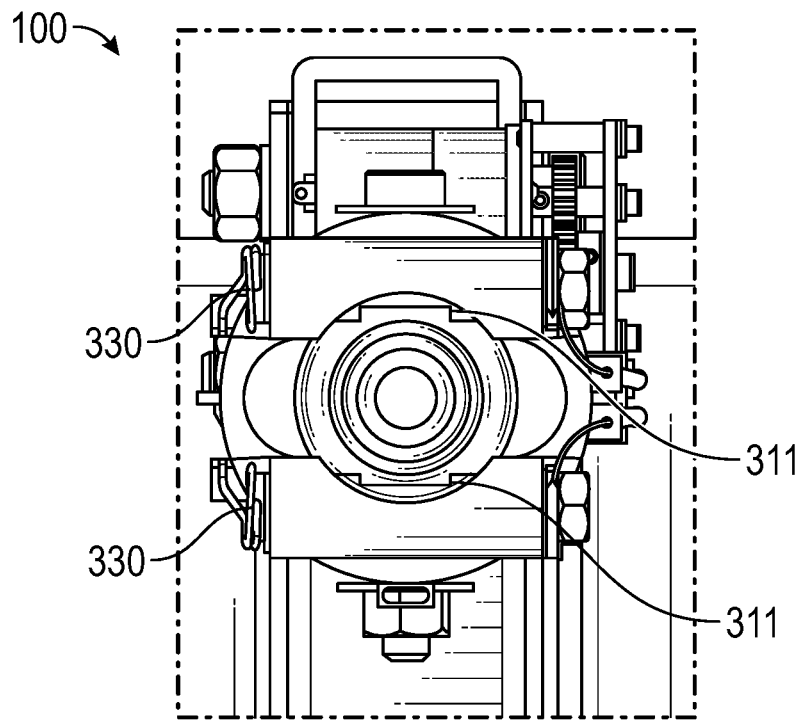

FIG. 3C is a front view of trailer coupler assembly 100 when securing pins 310 have been rotated against the biasing force to cause notches 311 to face one another (e.g., upwardly and downwardly respectively). Although not shown, securing pins 310 could be rotated into this orientation when hitch ball 13 is forced against notches 311. For example, if a vehicle having hitch ball 13 were backed towards a trailer having trailer coupler assembly 100, the force of hitch ball 13 against notches 311 could overcome the biasing force of springs 330 thereby allowing securing pins 310 to rotate to cause notches 311 to face one another. The dimensions of notches 311 can be configured to allow hitch ball 13 to pass between securing pins 310 when notches 311 face one another. For example, the depth of notches 311 can be sufficient so that the distance between notches 311 when they face one another is greater than the diameter of hitch ball 13. Accordingly, the rotation of securing pins 310 allows hitch ball 13 to be inserted into frontward-facing opening 201. In embodiments with a single securing pin 310, the distance between notch 311 and the opposing side of frontward-facing opening 201 that notch 311 faces once rotated can be greater than the diameter of hitch ball 13 to thereby allow hitch ball 13 to pass through.

Figure 3D:
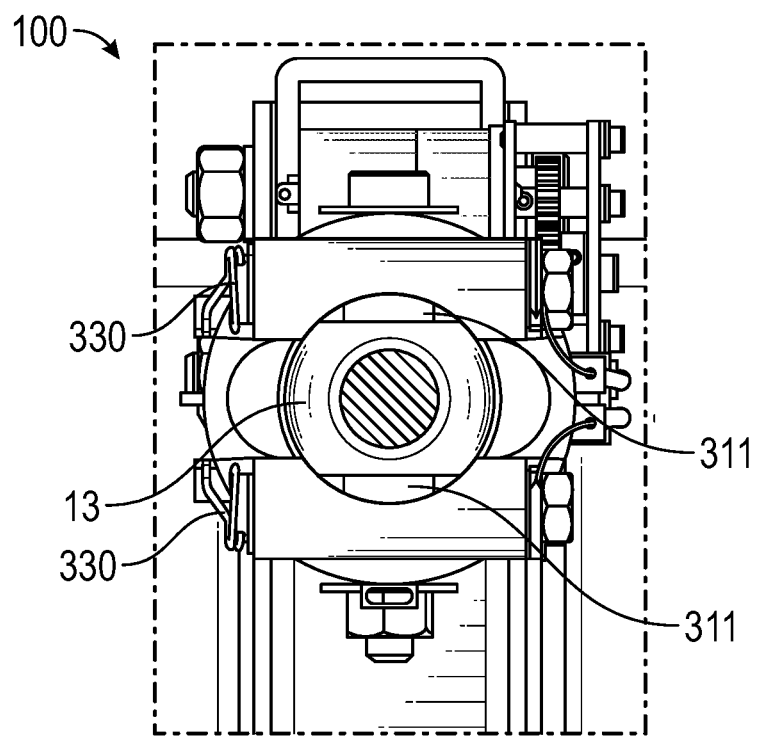

As represented in FIG. 3D, which is a cross-sectional front view, once hitch ball 13 has passed into frontward-facing opening 201 (e.g., as the vehicle is backed towards the trailer), the biasing force of springs 330 can rotate securing pins 310 back into the orientation shown in FIG. 1B thereby retaining hitch ball 13 within frontward-facing opening 201. Notably, in their frontward-facing orientations, notches 311 will be oriented away from hitch ball 13 when hitch ball 13 is positioned within frontward-facing opening 201. Therefore, as hitch ball 13 is pulled forwardly against securing pins 310, such as during towing, the frontward force of hitch ball 13 will be applied tangentially to the rounded portion of securing pins 310 as opposed to notches 311 which, in combination with the biasing force from springs 330, will tend to retain securing pins 310 in their frontward-facing orientation.

Figure 4A:
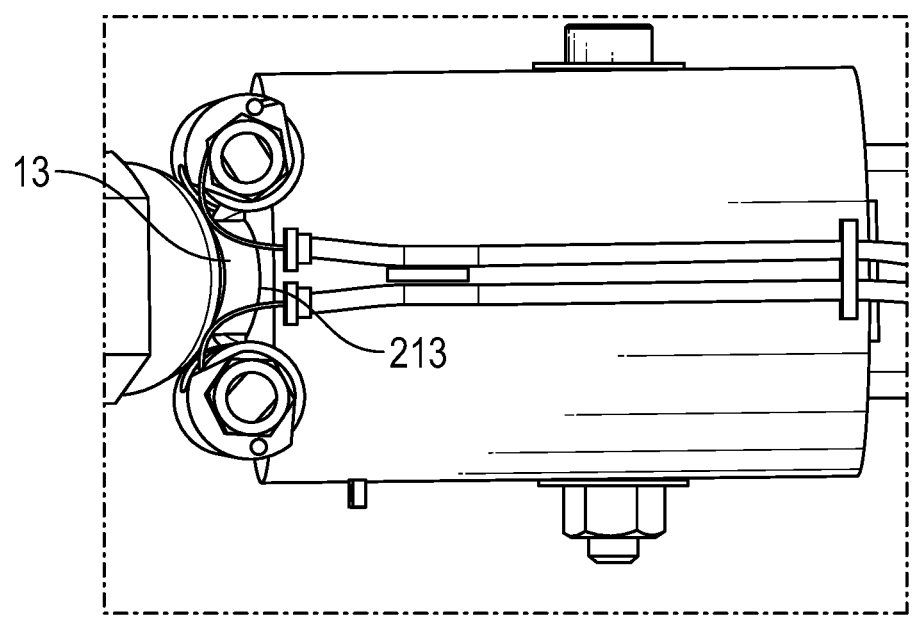
FIGS. 4A and 4B provide examples of how a trailer coupler assembly configured in accordance with one or more embodiments of the present invention enables wide articulation angles.
Figure 4B:
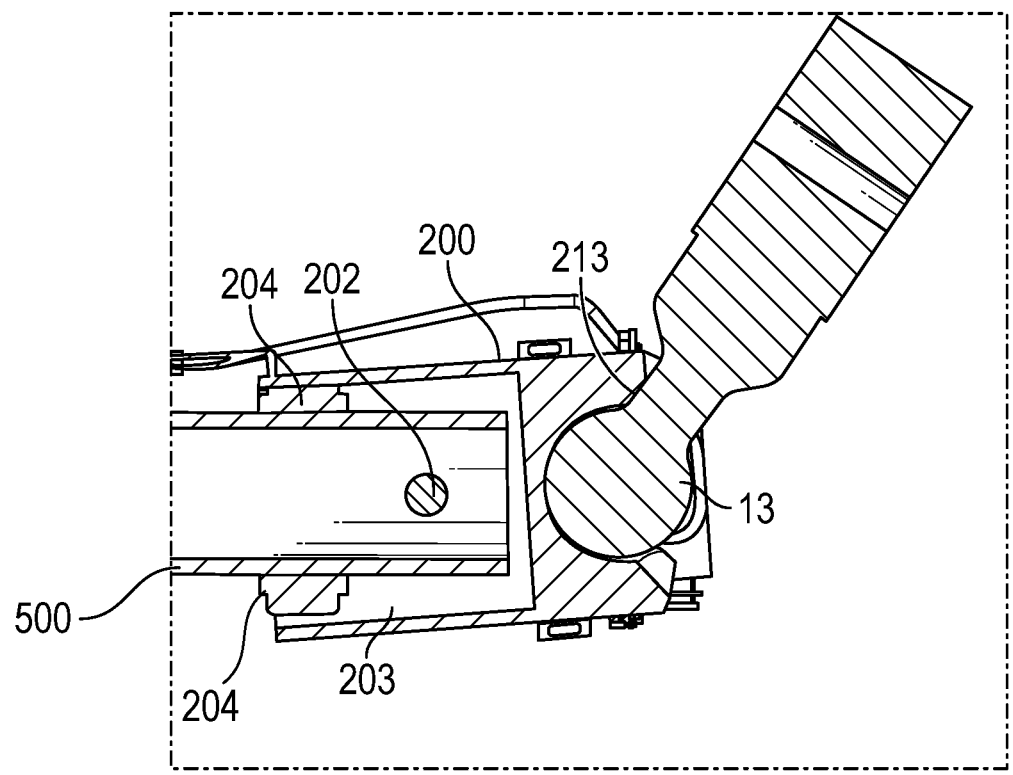

FIGS. 4A and 4B provide examples of how trailer coupler assembly 100 enables a trailer to have a large articulation angle. As shown in FIG. 4A, when the vehicle turns thereby causing hitch ball 13 to pivot relative to main body 200, the base of hitch ball 13 will approach the front face of main body 200. By positioning beveled edges 213 at the sides of frontward-facing opening 201, hitch ball 13 can pivot a larger amount before contacting the front face of main body 200. For example, in some embodiments, beveled edges 213 can be configured to enable the trailer to have an articulation angle of around 45 degrees.

FIG. 4B represents how main body 200 can increase the articulation angle. As shown, hitch ball 13 has been pivoted to the point that it contacts beveled edge 213. At this point, hitch ball 13 will apply a pivoting force against main body 200. Due to pivoting connection 202, main body 200 is capable of pivoting relative to shaft 500 and therefore relative to the trailer. Furthermore, this pivoting is enabled due to the compressibility of bumper 204. For example, in FIG. 4B, bumper 204 is compressed between main body 200 and shaft 500. In some embodiments, bumper 204 may be compressible to facilitate an increase of 5 degrees in the articulation angle. In such embodiments, the combination of beveled edge 213 and bumper 204 can enable an articulation angle of around 50 degrees. However, any other reasonable articulation angle could be achieved.

Figure 5:
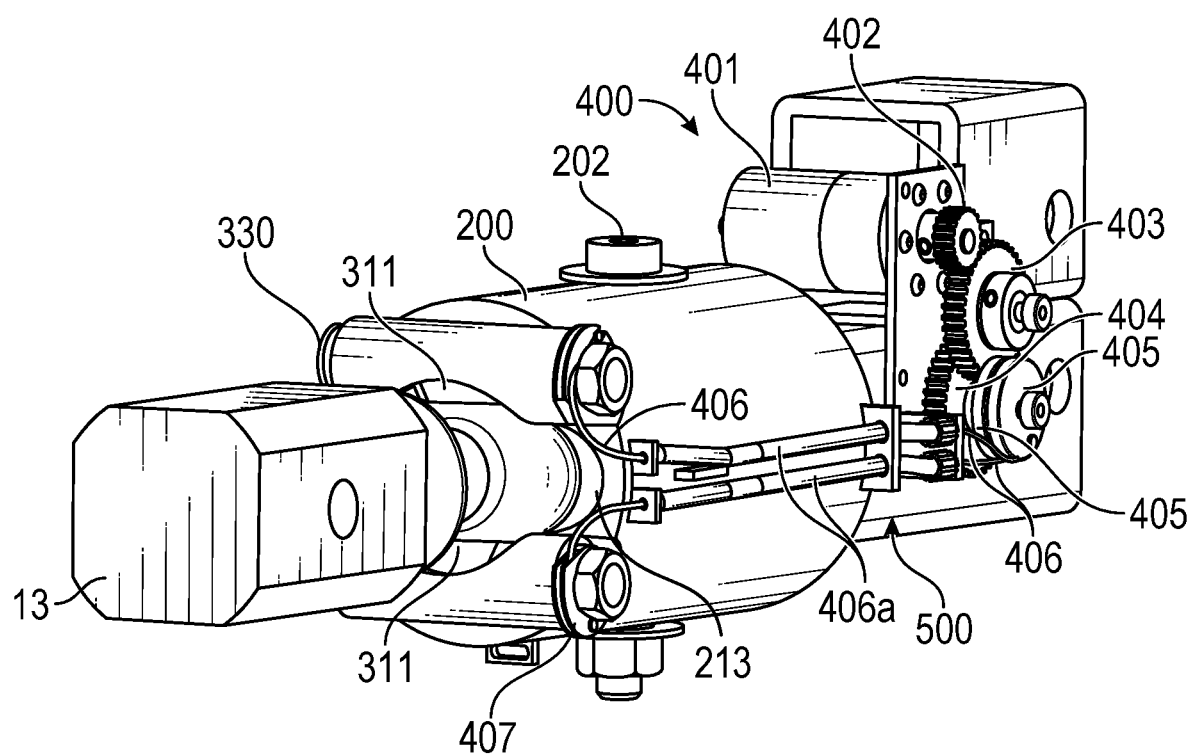
FIG. 5 illustrates a release assembly of a trailer coupler assembly configured in accordance with one or more embodiments of the present invention where the release assembly is configured to enable the trailer ball to be automatically decoupled.

FIG. 5 provides an example of how release assembly 400 can be configured. Release assembly 400 may include a motor 401 that drives a number of gears (e.g., gears 402, 403, and 404) for rotating pulleys 405. One end of wires 406 can be coupled to pulleys 405 while the other end of wires 406 can be coupled to and routed around securing pins 310. For example, a driver 407 can be secured to the end of each securing pin 310 opposite spring 330 and each wire 406 can be coupled to the respective driver 407. Wires 406 and/or sleeves 406a may be secured to main body 200 via guides 214.

When motor 401 is driven, pulleys 405 can apply a pulling force on wires 406. Due to the routing of wires 406 around securing pins 310 (e.g., around drivers 407), this pulling force can cause securing pins 310 to be rotated against the biasing force of springs 330 to cause notches 311 to face one another. Accordingly, to decouple hitch ball 13 from trailer coupler assembly 100, motor 401 can be driven. Once motor 401 is no longer driven, springs 330 can bias securing pins 310 back into their frontward facing orientations. Motor 401 could be powered in any suitable manner such as via a power source on the trailer, from the vehicle, via a battery, etc. Motor 401 can also be controlled in any suitable manner. For example, motor 401 could be integrated with a wireless receiver that enables a user to drive motor 401 via a key fob, a mobile application, or other transmitter. In some embodiments, motor 401 could be coupled to a control system of an electric vehicle (e.g., via the trailer wiring) and could therefore be controlled directly from the vehicle.

In some embodiments, trailer coupler assembly 100 could include or be integrated with a lift mechanism that enables the height of main body 200 relative to the ground to be adjusted. For example, a remote-controlled lift mechanism could be mounted to the trailer and could be used to position main body 200 at the appropriate height relative to hitch ball 13. Such a lift mechanism could facilitate aligning main body 200 to hitch ball 13 while a driver backs a vehicle towards the trailer (e.g., while using a rear camera). In some embodiments, one or more sensors (e.g., infrared, Bluetooth, RFID, vision, etc.) could be integrated into main body 200, hitch ball, and/or nearby component to detect the height of an approaching hitch ball 13 relative to frontward-facing opening 201 and could be used to automatically drive a lift mechanism to align frontward-facing opening 201 to hitch ball 13. In such embodiments, such sensors could be used to authenticate a vehicle and/or a trailer before enabling securing pin(s) 310 to be rotated to thereby enable coupling to or decoupling from the trailer. For example, a trailer coupler assembly configured in accordance with embodiments of the present invention could include circuitry that prevents securing pin(s) 310 from rotating until a particular code or sequence is received/detected from the vehicle and/or a user of the vehicle.

As can be seen, a trailer coupler assembly configured in accordance with embodiments of the present invention can facilitate the automatic coupling and decoupling of a trailer. For example, a user need only back a vehicle to insert hitch ball 13 into frontward-facing opening 201 to connect a trailer to the vehicle. A trailer coupler assembly configured in accordance with embodiments of the present invention also enables autonomous coupling and decoupling of a trailer. For example, an autonomous vehicle can employ its camera(s) and/or sensor(s) to back up to insert hitch ball 13 into frontward-facing opening 201 to couple to a trailer and may use its control system or other transmitter to drive motor 401 to decouple from the trailer. In such embodiments, a remotely controlled lift mechanism could be included on the trailer to facilitate this autonomous coupling and decoupling.

A trailer coupler assembly configured in accordance with embodiments of the present invention can also minimize the risk of overturning or otherwise damaging the vehicle when the trailer rolls over. For example, when a trailer is coupled to a vehicle with a traditional upwardly oriented hitch ball, if the trailer rolls over, it will apply a rotational force on the vehicle and potentially cause the vehicle to roll over or lose control. In contrast, when a trailer is coupled to a vehicle with a trailer coupler assembly configured in accordance with embodiments of the present invention, as the trailer rolls over, the frontward-oriented opening can rotate around the rearwardly oriented hitch ball thereby eliminating any rotational force on the vehicle. Accordingly, the vehicle can continue to tow/drag the rolled over trailer until it can safely come to a stop.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A trailer coupler assembly comprising:
   a main body having a frontward-facing opening that is configured to receive a rearwardly oriented hitch ball as a vehicle that includes the rearwardly oriented hitch ball travels rearwardly relative to a trailer that includes the trailer coupler assembly; and
   a locking assembly comprising at least one securing pin that extends across the frontward-facing opening, the at least one securing pin being configured to rotate between a first orientation in which the rearwardly oriented hitch ball is prevented from passing through the frontward-facing opening and a second orientation in which the rearwardly oriented hitch ball is allowed to pass through the frontward-facing opening such that the locking assembly allows the rearwardly oriented hitch ball to pass through the frontward-facing opening as the vehicle travels rearwardly relative to the trailer and then prevents the rearwardly oriented hitch ball from passing through the frontward-facing opening to thereby couple the vehicle to the trailer for towing as an automatic result of the rearwardly oriented hitch ball passing through the frontward-facing opening.

2. The trailer coupler assembly of claim 1, wherein the at least one securing pin comprises opposing securing pins and a distance between the opposing securing pins is configured to be less than a diameter of the rearwardly oriented hitch ball.

3. The trailer coupler assembly of claim 2, wherein each of the opposing securing pins includes a notch.

4. A trailer coupler assembly comprising:
   a main body having a frontward-facing opening that is configured to receive a rearwardly oriented hitch ball; and
   a locking assembly comprising at least one securing pin that extends across the frontward-facing opening;
   wherein the at least one securing pin comprises opposing securing pins and a distance between the opposing securing pins is configured to be less than a diameter of the rearwardly oriented hitch ball;
   wherein each of the opposing securing pins includes a notch;
   wherein, when the notches face one another, a distance between the notches is greater than the diameter of the rearwardly oriented hitch ball to thereby allow the rearwardly oriented hitch ball to pass between the opposing securing pins.

5. The trailer coupler assembly of claim 4, wherein the main body includes opposing housings in which the opposing securing pins are positioned.

6. The trailer coupler assembly of claim 5, wherein the opposing securing pins rotate within the opposing housings.

7. The trailer coupler assembly of claim 6, wherein the opposing securing pins are biased to orient the notches frontwardly.

8. The trailer coupler assembly of claim 7, wherein the opposing securing pins are configured to rotate in response to the rearwardly oriented hitch ball being forced rearwardly against the opposing securing pins to thereby cause the notches to face one another.

9. The trailer coupler assembly of claim 5, wherein the opposing housings include cutouts that correspond with the frontward-facing opening.

10. The trailer coupler assembly of claim 9, wherein the opposing securing pins extend into the cutouts to thereby overlap the frontward-facing opening.

11. The trailer coupler assembly of claim 4, further comprising:
    a release assembly that is configured to rotate the opposing securing pins to cause the notches to face one another.

12. The trailer coupler assembly of claim 11, wherein the release assembly includes one or more wires that are pulled by a motor to cause the opposing securing pins to be rotated.

13. The trailer coupler assembly of claim 1, wherein the main body includes beveled edges at opposing sides of the frontward-facing opening.

14. The trailer coupler assembly of claim 1, wherein the main body includes a hollow rear interior by which the main body is coupled to a shaft and a bumper that is positioned within the hollow rear interior, the bumper being compressible to enable the main body to pivot relative to the shaft.

15. A trailer coupler assembly comprising:
    a main body having a frontward-facing opening that is configured to receive a rearwardly oriented hitch ball and opposing housings positioned at a top and a bottom of the frontward-facing opening; and
    a locking assembly comprising opposing securing pins that are positioned within the opposing housings, the opposing securing pins being configured to rotate between a first orientation in which the rearwardly oriented hitch ball is prevented from passing through the frontward-facing opening and a second orientation in which the rearwardly oriented hitch ball is allowed to pass through the frontward-facing opening.

16. The trailer coupler assembly of claim 15, wherein each of the opposing securing pins includes a notch, and wherein, when the opposing securing pins are in the second orientation, the notches face one another.

17. The trailer coupler assembly of claim 16, wherein the notches are oriented frontwardly when in the first orientation and are biased into the first orientation such that, when the rearwardly oriented hitch ball is forced rearwardly against the notches, the opposing securing pins are rotated into the second orientation.

18. The trailer coupler assembly of claim 15, further comprising:
    a release assembly that is configured to rotate the opposing securing pins from the first orientation to the second orientation.

19. A trailer coupler assembly comprising:
    a main body having a frontward-facing opening and at least one housing having a cutout corresponding to the frontward-facing opening, the frontward-facing opening being configured to receive a rearwardly oriented hitch ball as a vehicle that includes the rearwardly oriented hitch ball travels rearwardly relative to a trailer that includes the trailer coupler assembly; and
    a locking assembly comprising at least one securing pin that is positioned in the respective at least one housing and extends out from the cutout overtop the frontward-facing opening, each of the at least one securing pin including a notch for selectively enabling the rearwardly oriented hitch ball to pass through the frontward-facing opening;
    wherein each of the at least one securing pin is configured to rotate between a first orientation in which the notch prevents the rearwardly oriented hitch ball from passing through the frontward-facing opening and a second orientation in which the notch enables the rearwardly oriented hitch ball to pass through the frontward-facing opening such that the locking assembly allows the rearwardly oriented hitch ball to pass through the frontward-facing opening as the vehicle travels rearwardly relative to the trailer and then prevents the rearwardly oriented hitch ball from passing through the frontward-facing opening to thereby couple the vehicle to the trailer for towing as an automatic result of the rearwardly oriented hitch ball passing through the frontward-facing opening.

20. The trailer coupler assembly of claim 19, wherein the at least one housing comprises two housings and the at least one securing pin comprises two securing pins.

\* \* \* \* \*